United States Patent
Kraus

[11] Patent Number: 6,135,158
[45] Date of Patent: Oct. 24, 2000

[54] OVERMOLDED AIR DUCT WITH OUTWARDLY EXTENDING MAIN BODY LIP

[75] Inventor: John Kraus, Akron, Ohio

[73] Assignee: Carlisle Engineered Products, Chardom, Ohio

[21] Appl. No.: 09/153,174

[22] Filed: Sep. 15, 1998

[51] Int. Cl.[7] ..................................................... F16L 9/12
[52] U.S. Cl. ........................... 138/109; 138/155; 285/331
[58] Field of Search .................................... 138/109, 155, 138/120; 285/321, 236, 331, 242, 919

[56] References Cited

U.S. PATENT DOCUMENTS

| | | | |
|---|---|---|---|
| 3,323,552 | 6/1967 | Whitehead, Jr. | 138/120 |
| 4,657,285 | 4/1987 | Akiyama et al. | 138/109 X |
| 4,865,362 | 9/1989 | Holden | 138/120 X |
| 5,443,098 | 8/1995 | Kertesz | 138/109 |
| 5,682,924 | 11/1997 | Powell | 138/155 X |

*Primary Examiner*—Patrick Brinson
*Attorney, Agent, or Firm*—Rader, Fishman & Grauer PLLC

[57] ABSTRACT

An inventive air duct includes a blow molded tubular body of a first material having at least one annular open end, the open end terminating at a radially outwardly extending lip. A cuff of a second material is molded to the main body such that at least a portion of the lip is embedded within the cuff. Before molding the cuff, a portion of the main body adjacent the open end is pre-formed to remove any seams created during blow molding and to provide improved dimensional stability. Thus, leak pathways are minimized. The improved dimensional stability in combination with the use of an outwardly extending lip, a portion of which is embedded within the cuff, helps promote a strong seal between the cuff and the main body.

11 Claims, 4 Drawing Sheets

OVERMOLDED AIR DUCT WITH OUTWARDLY EXTENDING MAIN BODY LIP

FIELD OF THE INVENTION

The present invention relates in general to an air duct. More specifically, the invention relates to an air duct having a main body formed from a first material by means of a blow molding process and a cuff formed from a second material which is injection molded to an open end of the main body.

BACKGROUND OF THE INVENTION

Air ducts are known for use in automotive applications for a number of purposes. For example, they are used to transfer filtered air from an automotive air filter through the air intake system of an internal combustion engine. They are also used to transfer temperature modified air from within the engine compartment to the passenger compartment.

Air ducts are often formed using two different approaches. One approach involves low cost conventional blow molding. A second approach involves a high cost intermittent dual durometer extrusion. As a compromise, it is known to mold a polymeric material to a blow molded duct. In one teaching a blow mold is provided with at least one embedded knife. A tubular body is formed by means of blow molding which includes an apex adjacent where the embedded knife is located. The knife is used to remove the bubbled end formed during the blow molding process. Once the bubbled end is removed, the remaining tubular body includes an inwardly directed lip at an open end. The open end with inwardly directed lip is inserted onto a mandrel and a polymeric material is injection molded around the tubular body and the mandrel. The inwardly directed lip is taught to provide a compressive sealing force on the mandrel to provide a unique sealing arrangement.

While the latter approach provides a compromise between conventional blow molding and dual durometer extrusion, the use of an inwardly extending lip is highly undesirable as consistent wall thickness is difficult to maintain due to process variations. In particular, there is a potential for undesirable separation of the tubular body and the polymeric material in part because of the limited area of contact between the lip and the polymeric material.

Further, attempting to injection mold over a blow molded component is not easy. Blow molded components tend to have an interruption created at a seam between opposing blow molds, providing a ready pathway for leakage. When polymeric material is injection molded to a blow molded tubular body, high pressures are obtained. If a uniform seal cannot be obtained between the injection mold and both the tubular body and the mandrel, such an interruption and the leak pathway it provides will reduce the pressure that must be maintained within an injection mold cavity and provide a way for the injection molded material to escape. The use of an inwardly directed lip compressively engaging a mandrel prior to an injection molding step provides, only limited sealing potential. At best, a seal is only assured at the point of contact between the lip end and the mandrel and only in the case of relatively thin walled air ducts (below 2.5 mm). More likely, leakage is still likely since the interruption formed during blow molding is not eliminated.

SUMMARY OF THE INVENTION

An air duct includes a blow molded tubular main body having at least one annular open end, the open end terminating at a radially outwardly extending lip angled outwardly with respect to the tubular main body. The inner periphery of the main body has a dimensionally stable and uniform surface, thereby lacking evidence of a seam created during formation. A cuff is molded to the main body such that at least a portion of the lip is embedded within the cuff.

The basic approach for forming the inventive air duct comprises first blow molding a cavity by enclosing a parison of thermoplastic material between two engaging mold halves, inserting a blow pin between the mold halves which engages the parison, and blowing air through the blow pin to inflate the parison to form the cavity. Optionally, a needle may be used to blow the parison.

The bubbled end of the cavity is then removed to form a main body having an open end. In one preferred embodiment, a cylindrical striker sleeve is positioned about the outer periphery of the blow pin and striker plates are embedded in the mold halves. The striker sleeve moves relative to the blow pin, cuts through the wall of the cavity, and engages the striker plates.

Next, at least an inner periphery of the main body adjacent the open end is pre-formed by removing evidence of the seam formed along the inner periphery by the blow mold halves during the blow molding process and forming a dimensionally stable, uniform smooth surface. The outer surface and lip may also be similarly pre-formed. To complete the pre-forming process, the affected material is heated. Then it is sandwiched between a mandrel received in the open end and a staging fixture in facing contact with the outer surface adjacent the open end. The heating may be accomplished by means of the mandrel or by using a separate heat source before inserting the mandrel into the main body.

Once the main body is pre-formed, a cuff is injection molded about the outer surface of the main body, with at least a portion of the outwardly extending lip embedded within the cuff.

The use of an outwardly directed lip and the pre-forming of at least the inner periphery of the main body adjacent the open end are both key features of the invention. It is typically very difficult to injection mold over a blow molded component because of the leak pathway created by the seams formed during blow molding. By having at least a dimensionally stable and uniform inner periphery, the seal between the mandrel, main body, and injection mold halves is greatly improved. The outer surface adjacent the open end and the lip are also preferably pre-formed at the same time to promote improved cuff retention and a leak free seal. In particular, a leak free seal is further assured by having at least a portion of the outwardly extending lip embedded within the cuff.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
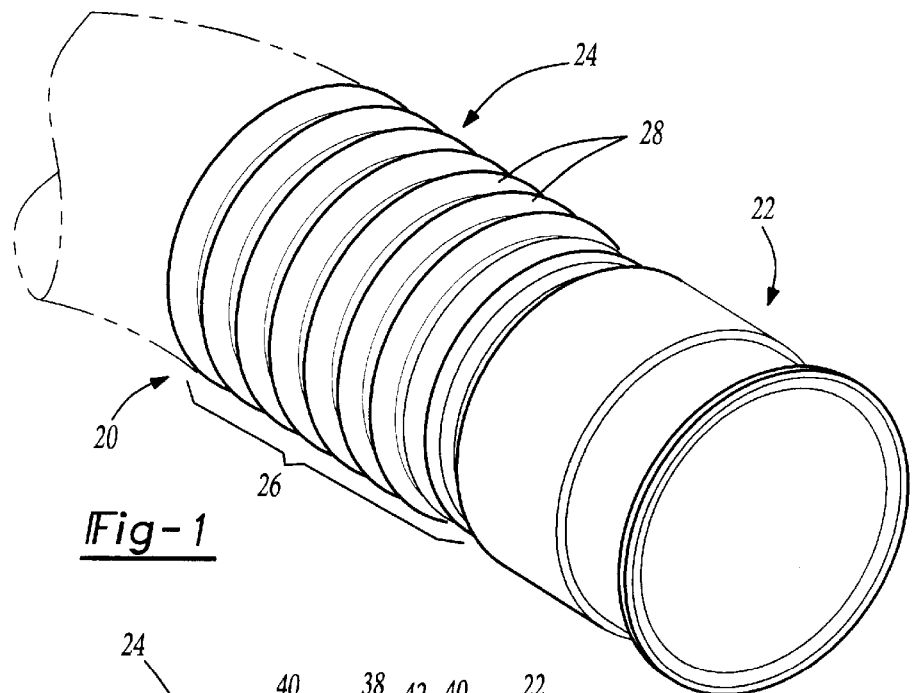
FIG. 1 is a perspective view of a clean air duct having a main body formed of a first material and a cuff molded to an open end of the main body.
Figure 2:
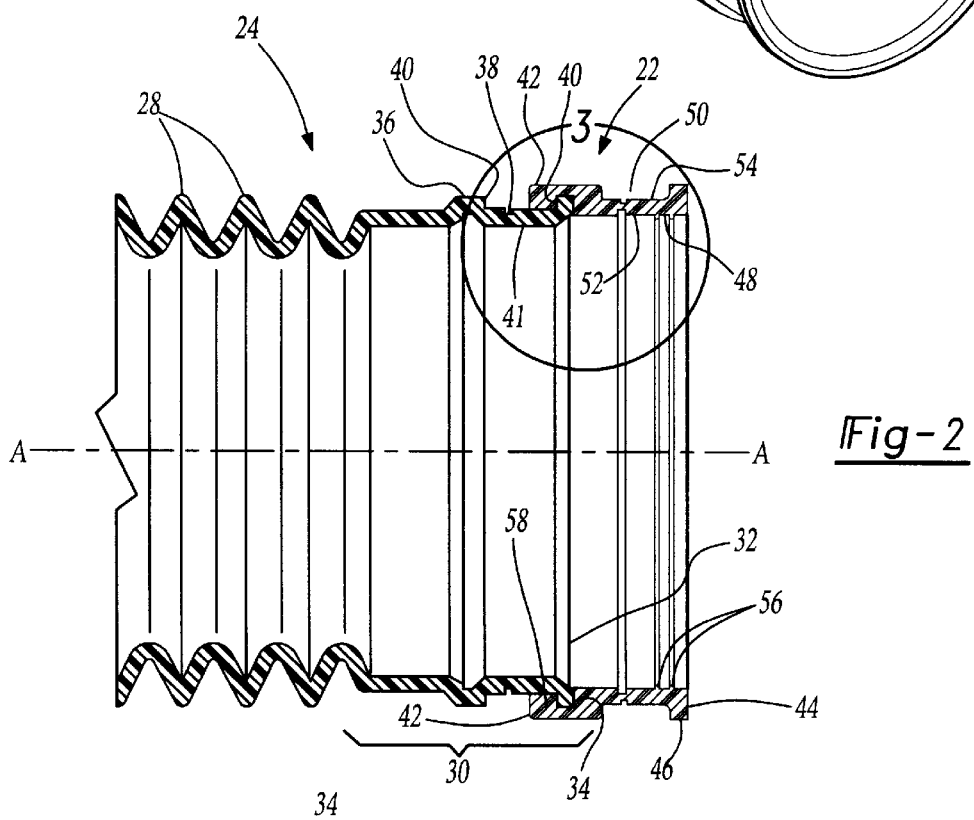
FIG. 2 is a cross sectional view of the clean air duct of FIG. 1 showing that the open end of the main body includes an integral outwardly directed lip which is embedded in the cuff material to provide an improved bond between the main body and the cuff.
Figure 3:
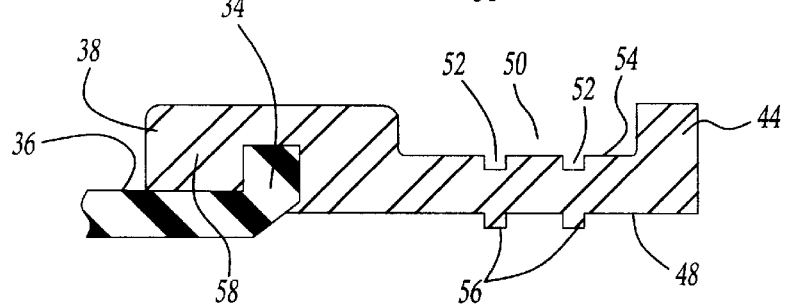
FIG. 3 is an enlarged cross-sectional view of the cuff identified by encircled region 3.
Figure 4:
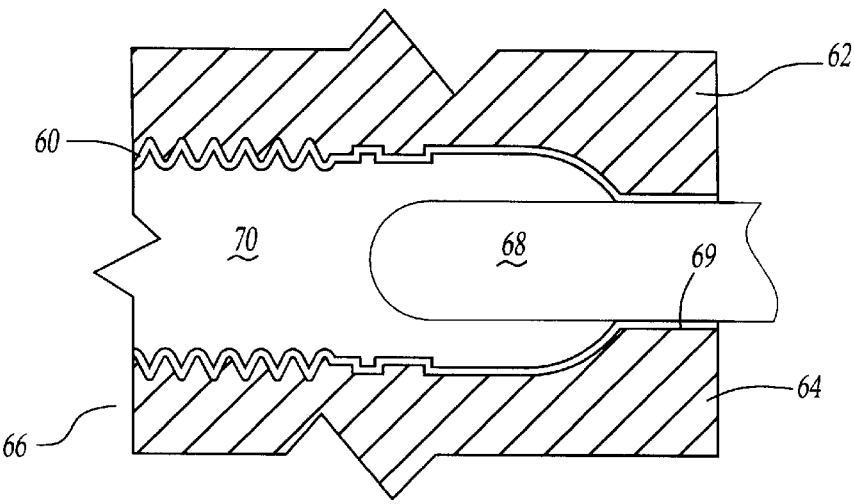
FIG. 4 illustrates the process of blow molding the main body of the duct.

An air duct 20 is illustrated in FIG. 1, wherein an annular cuff 22 is molded to a tubular main body 24. A cross-section of duct 20 is illustrated in FIG. 2 and a blowup of a portion of the cross-section is illustrated in FIG. 3.

Main body 24 is formed from a thermoplastic elastomer such as polypropylene. It includes a flexible central section 26 initially extending along an axis A—A with a plurality of sequentially spaced convolutions 28 to provide flexibility to the duct. Extending from central section 26 along axis A—A is an outer section 30 terminating at an annular open end 32 defined by an outwardly extending lip 34. Preferably, lip 34 is angled outwardly with respect to axis A—A. More preferably, lip 34 is generally perpendicular to axis A—A. An outer surface 36 of outer section 30 includes an annular groove 38 adjacent lip 34. Outer surface 36 also includes a shoulder 40 defining an inner portion of outer section 30, groove 38 disposed between shoulder 40 and lip 34. Both inner periphery 41 of main body 24 and outer surface 36 adjacent open end 32 have high dimensional stability and a uniform smooth surface finish.

Cuff 22 is also made from a thermoplastic elastomer. However, blending a specific elastomer with a specific plastic material makes the elastomer. Preferably, cuff 22 is formed from Santoprene™, which is a mixture of approximately 60 parts ethylene-propylene-diene monomer copolymer (EPDM) with 40 parts polypropylene.

A hydrocarbon oil, compatible with EPDM, and interlinking reagents for EPDM are also added. Because the polymers are molecularly incompatible, they form a fine heterogeneous blend, the individual materials remaining as small, separate regions. During mixing, the EPDM portion becomes chemically interlinked to create a rubbery solid that can be molded (and remolded) at high temperatures when the polypropylene component becomes soft and fluid.

Cuff 22 includes an inner end 42 and an outer end 44 with an outer surface 46 and an inner surface 48. Inner end 42 and outer end 44 have approximately the same outer diameter, with an inwardly extending channel 50 defined there between. At least one slot 52 extends inwardly from a base 54 of channel 50. Inner surface 48 includes at least one inwardly extending rib 56 adjacent outer end 44 and a second inwardly extending rib 58 adjacent inner end 42.

The nature of the materials from which cuff 22 and main body 24 are formed promotes bonding during molding. However, to further assure bonding, at least a portion of lip 34 is embedded within cuff 22. Additionally, rib 58 is received in groove 38 of main body 24.

Channel 50 is adapted to receive an adjustable collar (not shown). Once duct 20 is completed, it is typically secured to a mating component such as an automotive throttle body or air filter (not shown). The mating component engages inner surface 48 of cuff 22. Ribs 56 and 58 typically deform, helping to promote a tight seal between the cuff and the mating component. Finally, once the mating component is properly seated within cuff 22, the adjustable collar is tightened, thereby firmly securing the cuff to the mating component. To prevent overtightening and potential damage to cuff 22, slot 52 acts as a stress release, and may become filled with displaced material as the cuff is tightened.

Figure 5:
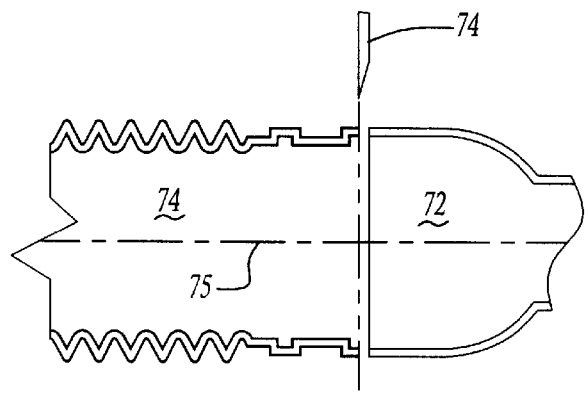
FIG. 5 illustrates the process of removing the bubble end of the main body by means of a guillotine blade.

One preferred approach to forming duct 20 is illustrated in FIGS. 4 through 8. The process begins with enclosing a parison 60 of plastic between two engaging mold halves 62 and 64 of a press 66. A blow pin 68 is inserted through an opening 69 defined between mold halves 62 and 64 which engages the parison 60. Air is then blown into the mold by means of blow pin 68. The internal pressure increases causes the plastic parison 60 to take the shape of a cavity 70. Alternatively, a needle (not shown) may be used in place of blow pin 6 to blow parison 60. After the blow mold cycle is completed, cavity 70 is removed from press 66. As shown in FIG. 5, bubbled end 72 is removed using a guillotine blade 74, leaving main body 24.

At this point, main body 24 typically has one or more seams in both the inner and outer surfaces of the main body as a result of an interruption created at the interface between opposing blow mold halves 62 and 64. As a result, inner periphery 41 lacks a dimensionally stable, uniform uninterrupted surface. Nor is lip 34 completely formed.

Figure 6:
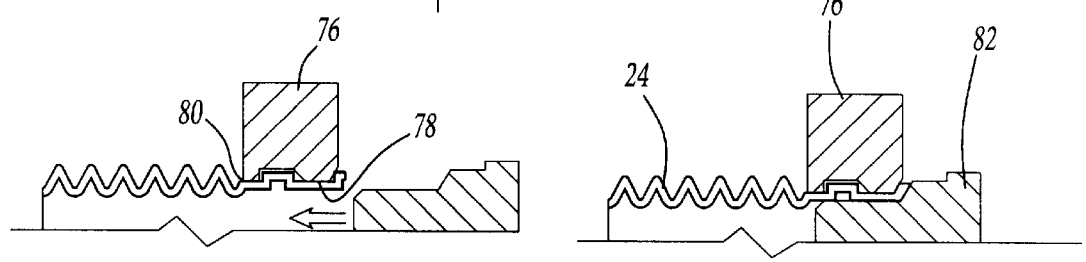
FIG. 6 illustrates the insertion of either a hot or a cold mandrel into the opening of the main body adjacent the inner diameter of the body with a staging fixture adjacent the outer diameter of the opening.
Figure 7:
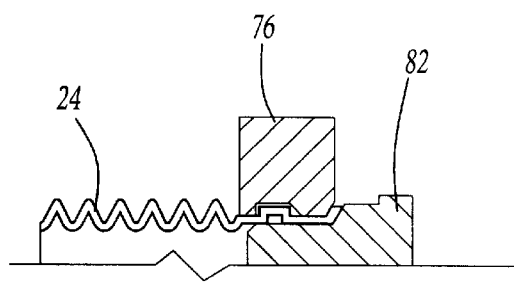
FIG. 7 illustrates the pre-forming of an outer section of the main body by means of pre-heated material of the outer section in combination with a staging fixture and a mandrel.
Figure 8:
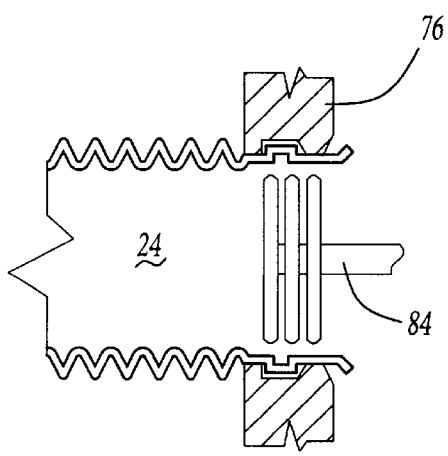
FIG. 8 illustrates the process of injection molding the cuff.

To eliminate the one or more seams and to create a dimensionally stable and uniform smooth surface about inner periphery 41, as well as to fully form integral lip 34, outer section 30 is next pre-formed and refined into a final shape with high dimensional tolerances. Generally, outer surface 36 of outer section 30 is also pre-formed at the same time with the same dimensionally stability and uniform surface finish. As shown in FIG. 6, a staging fixture 76 is positioned adjacent outer surface 36, an edge surface 78 of the fixture engaging an outer surface of partially formed lip 34 and a groove 80 of the fixture receiving partially formed shoulder 40. Next, heat is applied to raise the temperature of outer section 30 to a flowable consistency. Heat is applied either by means of a heated mandrel 82, shown in FIG. 7, or a separate heating source, such as a short wave emitter 84, illustrated in FIG. 8, which is inserted into the duct. If emitter 84 is used, mandrel is cool when inserted, as shown in FIG. 8. Once outer section 30 is appropriately heated to a pliable state, the material of outer section 30 is sandwiched between mandrel 82 and staging fixture 76, forcing the outer section to its final shape with lip 34, a smooth uniform surface of inner periphery 41, shoulder 40, and groove 38. Further, any excess flash material left on main body 24 after using blade 74, is also removed or redistributed.

Figure 9:
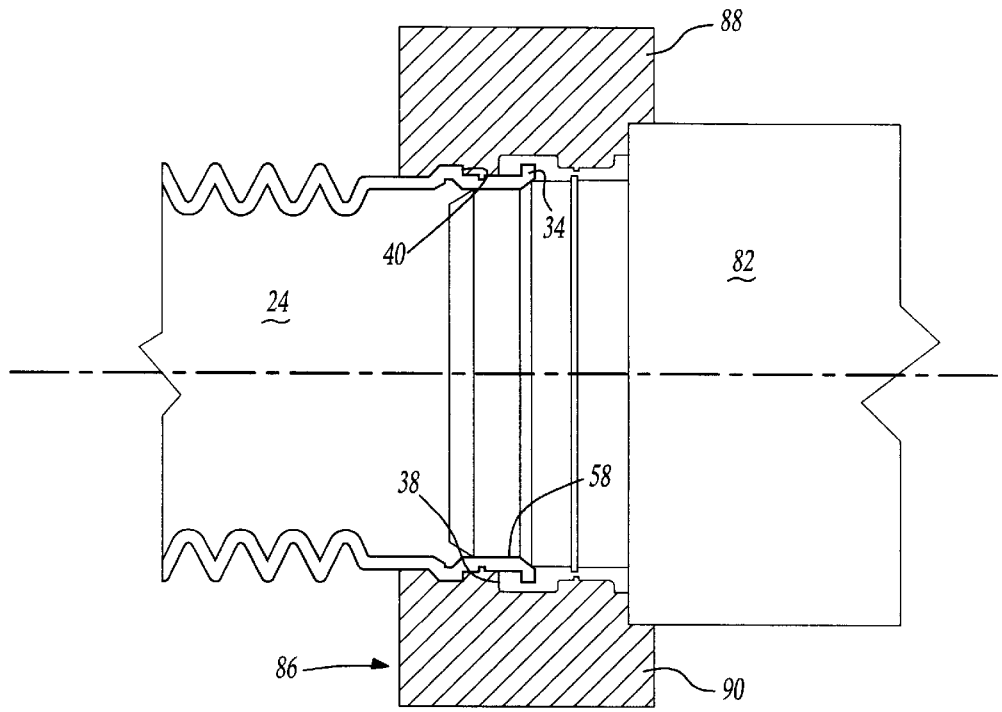
FIG. 9 illustrates an alternative method for heating the outer section of the main body prior to the pre-forming step.

At last staging fixture 76 is now removed. Next, as shown in FIG. 9, the finished main body 24 is inserted into an injection mold press 86 having mold halves 88 and 90. Mold halves 88 and 90 are closed around main body 24 and mandrel 82, forming a cavity for the molded cuff 22. Mold halves 88 and 90 include a groove 92 adapted to receive shoulder 40 of outer section 30. Shoulder 40 engaging with groove 92 helps to properly position cuff 22 with respect to main body 24 and prevent inadvertent shifting of the main body under the high pressures of injection. The cuff material is molded with at least a portion of lip 34 embedded therein and the final part removed from press 86.

The pre-forming step is very important to the successful molding of cuff 22 to main body 24. It is typically very difficult to injection mold over a blow-molded component. As noted above, blow molded components have one or more seams 75 created at interruptions formed at the interface between opposing blow mold halves 62 and 64, providing a ready pathway for leakage of both air and injected materials under the high pressure of injection molding. By having dimensional stability and uniform surface finish in outer section 30 such that inner periphery 41 is in direct contact with a corresponding face of mandrel 82 and outer surface 36 is in direct contact with a corresponding face of mold halves 88 and 90, a very robust seal is assured between cuff 22 and main body 24 along the entire surface of interaction. In a preferred embodiment, inner periphery 41 has a uniform diameter.

The materials of both cuff 22 and main body 24 are designed to bond to one another. Nevertheless, dimensional stability and uniformity along with embedding at least a portion of outwardly extending lip 34 into the material of cuff 22 and optionally locking of rib 58 within groove 38 further promotes a strong bond between the cuff and main body. Thus, a leak free seal between main body 24 and cuff 22 is assured.

Figure 10:
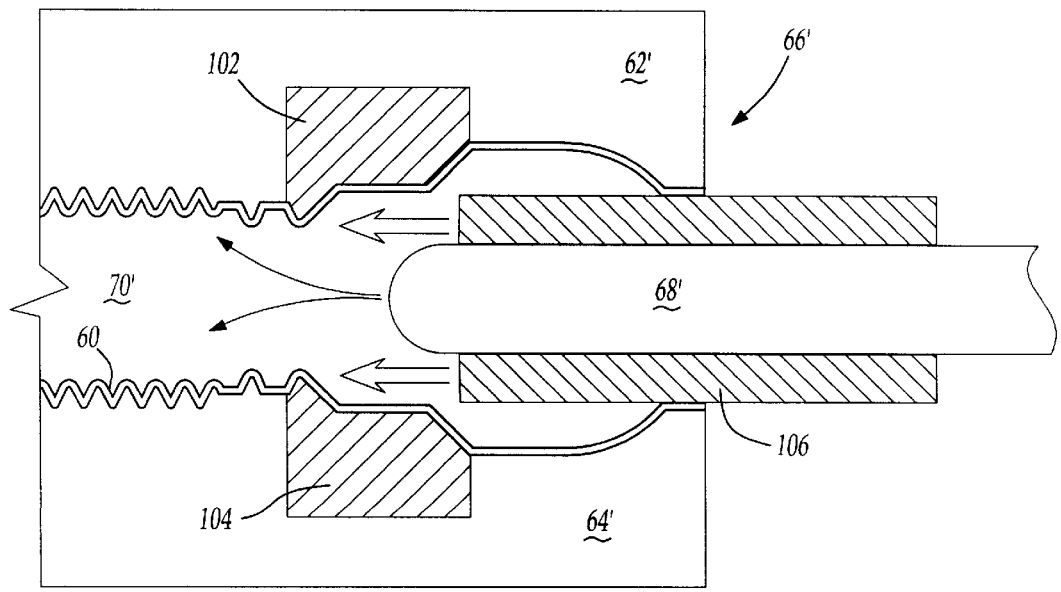
FIG. 10 illustrates an alternative embodiment of the invention with a striker sleeve surrounding a blow pin and the blow mold including striker plates.
Figure 11:
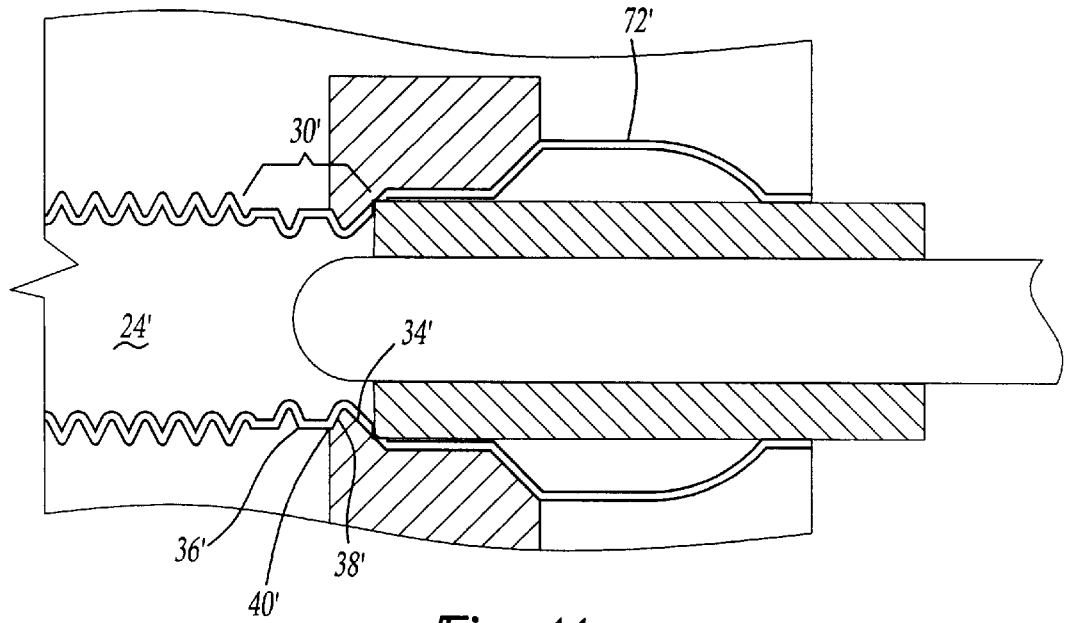
FIG. 11 illustrates the alternative embodiment of FIG. 9 wherein the bubble end of the main body is removed by means of the striker sleeve engaging the striker plates, an outwardly extending lip formed during the blow mold process.
Figure 12:
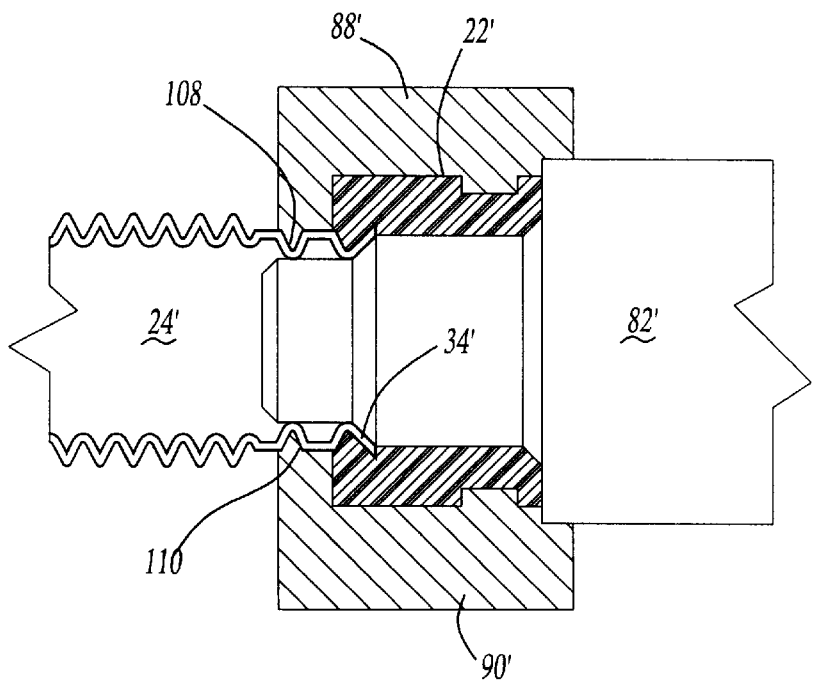
FIG. 12 illustrates the process of injection molding the cuff for the alternative embodiment of FIG. 9.

A second embodiment of the present invention, an air duct 20' is illustrated in FIGS. 9 through 11. Once again, the process begins with enclosing a parison 60 of plastic between two engaging mold halves 62' and 64' of a press 66'. However, mold halves 62' and 64' have striker plates 102 and 104, respectively, which are adjacent outer section 30' once cavity 70' is created. Preferably, striker plates 102 and 104 are formed from hardened steel. A blow pin 68' is inserted through an opening 69' defined between mold halves 62' and 64' which engages parison 60. Air is then blown into press 66 by means of blow pin 68'. The internal pressure increases causes the plastic parison 60 to take the shape of a cavity 70'. A generally cylindrical striker sleeve 106 is disposed about the outer periphery of blow pin 68'. Striker sleeve 106 is preferably formed from hardened steel. As shown in FIGS. 8 and 9, once cavity 70' is formed, striker sleeve 106 extends outwardly with respect to blow pin 68' and cuts through the cavity wall to engage striker plates 102 and 104. Thus, bubbled end 72' separates from main body 24' before mold halves 62' and 64' and blow pin 68' are disengaged. The terminal end of lip 34' is defined by the interaction between striker plate 102 and 104 and striker sleeve 106, and extends outwardly at an angle. Striker plates 102 are shaped to permit the formation of lip 34', outer surface 36, groove 38' and shoulder 40'.

Next, outer section 30' of main body 24' may be preformed using the same approach as discussed above to form a dimensionally stable, uniform inner periphery 41', and a corresponding outer surface 36'. However, in the alternative embodiment, the emphasis is on making sure that lip 34' is properly outwardly sloping, has no seams, and is uniform with respect to a corresponding chamfered step of mandrel 82'.

To prevent relative movement of main body 24' and cuff 22' during the injection molding process, shoulder 40' plays a limited role. Instead, outer section 30' includes a second groove 108 which is engaged by a rib 110 of each of mold halves 88' and 90' of injection mold press 86' as shown in FIG. 11. Mold halves 88' and 90' are closed around main body 24' and mandrel 82', lip 34' tightly sealed to the corresponding chamfered step of the mandrel to form a cavity for the molding of cuff 22'.

The disclosed embodiments and examples are given to illustrate the present invention. However, they are not meant to limit the scope and spirit of the present invention. Therefore, the present invention should be limited only by the appended claims.

What is claimed is:

1. An air duct comprising:

a blow molded tubular main body extending along a first axis having at least one annular open end, said open end terminating at a radially outwardly extending lip angled outwardly with respect to said first axis an inner periphery adjacent said lip, said inner periphery having a uniform surface, thereby lacking evidence of a seam created during formation; and a cuff molded to said main body such that lip is embedded within said cuff.

2. An air duct as recited in claim 1, wherein heat is applied to said inner periphery of said main body adjacent said lip prior to said inner periphery having said uniform surface.

3. An air duct as recited in claim 1, wherein an outer surface of said main body includes an annular groove adjacent said lip, and a rib is adjacent an inner end of said cuff, said rib of said cuff engaging said groove of said main body.

4. An air duct comprising:

a blow molded tubular main body having at least one annular open end, said open end terminating at a radially outwardly extending lip; and a cuff molded to said main body such that at least a portion of said lip is embedded within said cuff, wherein said cuff further includes a channel formed on an outer surface thereof, said channel being positioned between an inner end of said cuff and an outer end of said cuff.

5. An air duct as recited in claim 4, wherein said channel includes at least one slot extending inwardly from a base of said channel.

6. An air duct as recited in claim 4, wherein said cuff includes at least one inwardly extending rib formed on an interior surface of said cuff.

7. An air duct as recited in claim 4, wherein said cuff includes at least two inwardly extending ribs, a first rib positioned adjacent an outer end of said cuff and a second rib positioned adjacent to an inner end of said cuff.

8. An air duct as recited in claim 1, wherein said cuff includes at least one inwardly extending rib formed on an interior surface of said cuff.

9. An air duct as recited in claim 1, wherein said cuff further includes a channel formed on an outer surface thereof, said channel being positioned between an inner end of said cuff and an outer end of said cuff.

10. An air duct as recited in clam 8, wherein said channel includes at least one slot extending inwardly from a base of said channel.

11. An air duct as recited in claim 1, wherein said cuff includes at least two inwardly extending ribs formed on an interior surface of said cuff, a first rib positioned adjacent an outer end of said cuff and a second rib positioned adjacent to an inner end of said cuff.

* * * * *